April 21, 1964 J. W. KAPPEN 3,129,830
ARTICULATED ARM ASSEMBLY
Filed Nov. 9, 1960 3 Sheets-Sheet 1
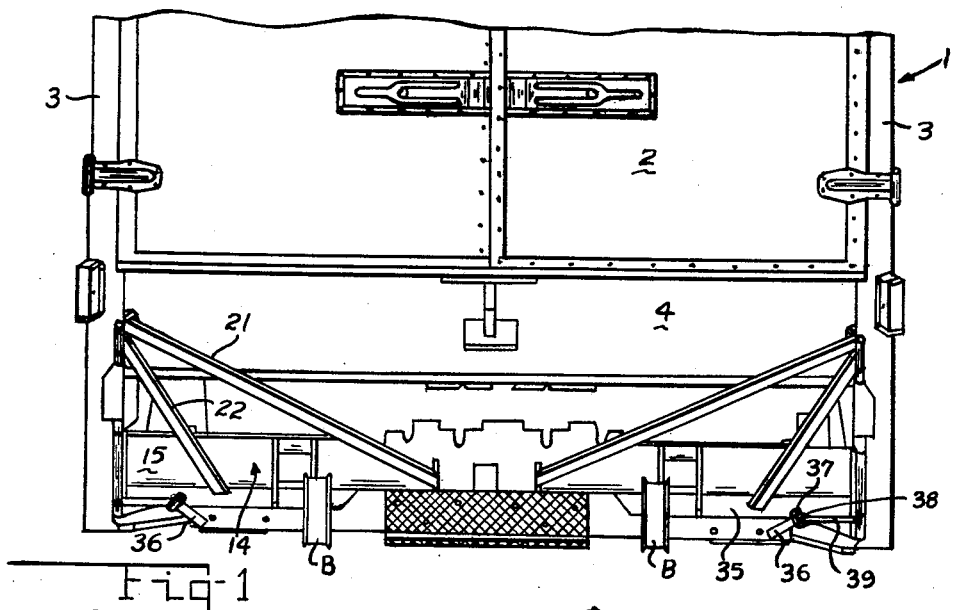
INVENTOR.
JOHN W. KAPPEN
BY Tom Walker
ATTORNEY

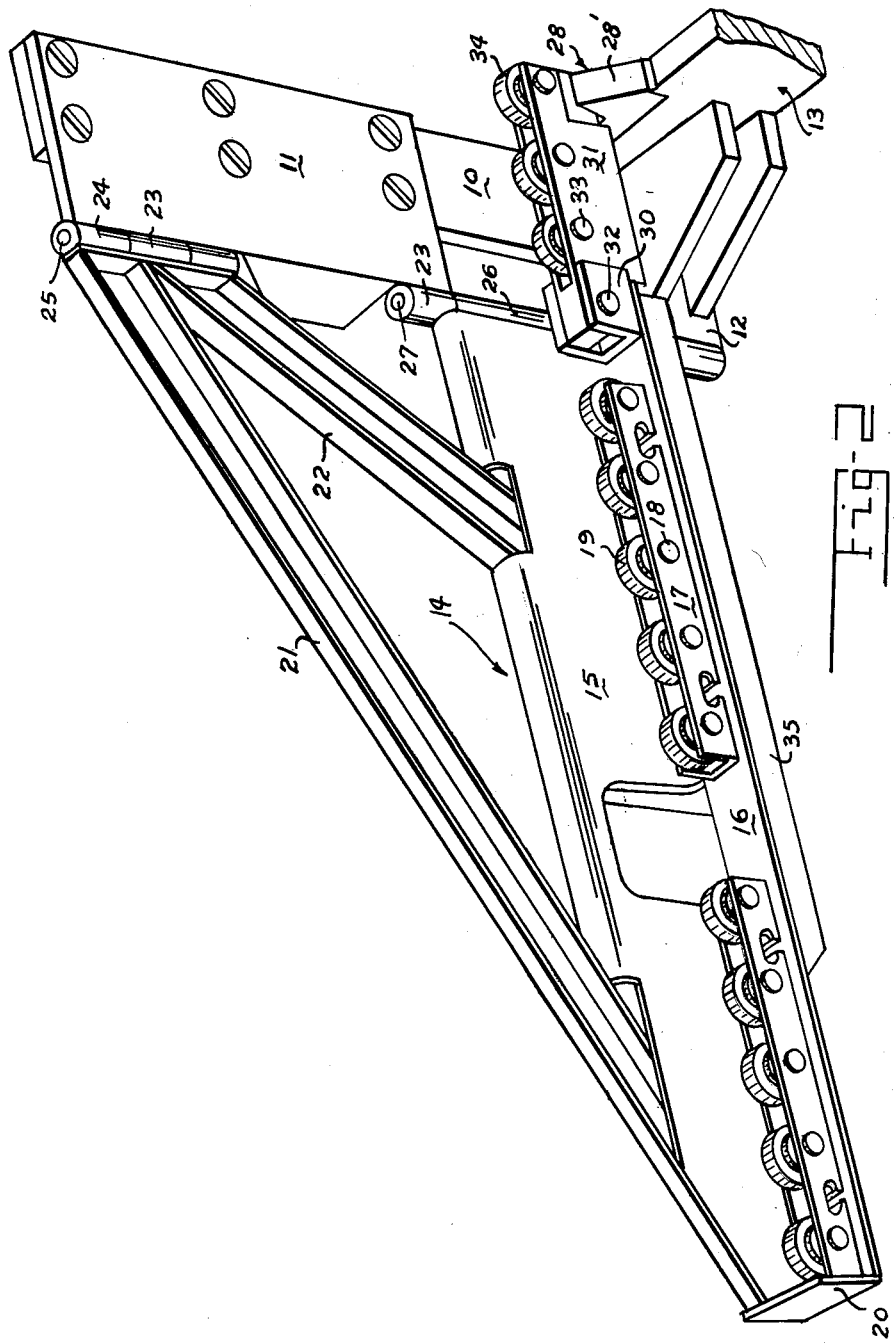

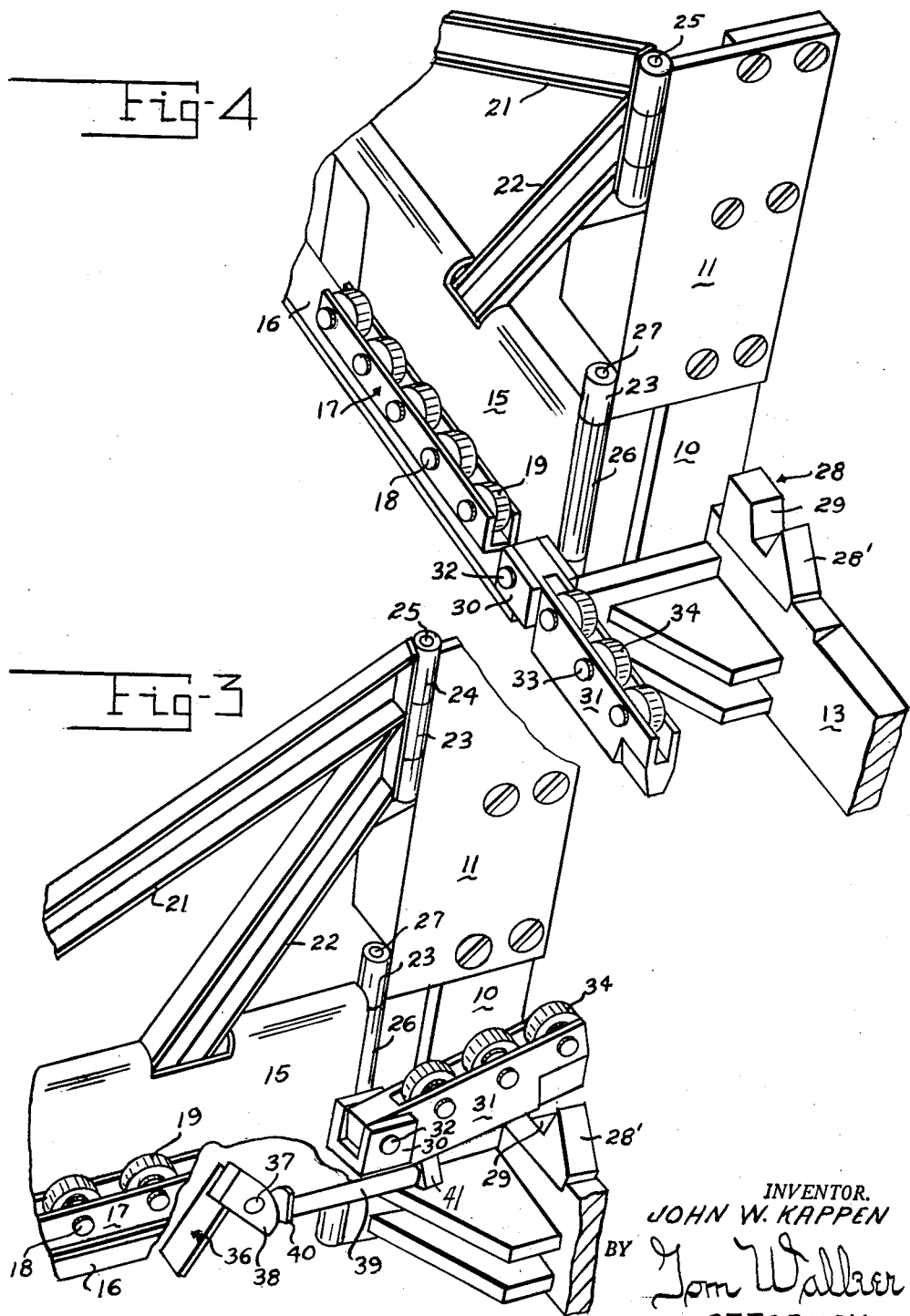

United States Patent Office 3,129,830
Patented Apr. 21, 1964

3,129,830
ARTICULATED ARM ASSEMBLY
John W. Kappen, Dayton, Ohio; Frieda E. Kappen,
administratrix of said John W. Kappen, deceased
Filed Nov. 9, 1960, Ser. No. 68,301
3 Claims. (Cl. 214—84)

This invention relates to an articulated arm assembly and more particularly to improvements in lift or support units. While a single embodiment will be described herein, and that in application to a freight truck, it will nevertheless be obvious that the form of embodiment and application of the invention is not so limited. Such is not intended.

The material handling art has developed considerably in recent years. It has been found that fork trucks and other mobile units incorporating elevator type lift arms are very effective in increasing the efficiency and reducing the cost of material handling and transfer procedures. The lift arms have proven to be particularly advantageous in application to freight trucks, enabling materials to be received on one level and readily transferred to another level for movement either to or from the body of the truck to which they are attached. In application to a mobile unit such as a freight truck, these arms must be securable in a stowed position for travel, projectable from the truck in a securely locked condition to receive and transport material from one level to another and also simply releasable for displacement from this projected position where circumstances require their clearance. The present invention is directed to improvements in such lift arms which render them more readily adaptable to application and use as described, simple to operate, and easier and less costly to fabricate.

The object of the invention is to simplify the construction as well as the means and mode of operation of arm assemblies, whereby such assemblies may not only be economically manufactured, but will be more efficient and satisfactory in use, adaptable to a wide variety of applications, and be unlikely to get out of order.

A further object of the invention is to provide a simplified articulated support apparatus.

Another object of the invention is to provide a simple support arm, particularly advantageous for material handling with reference to a freight or other material handling trucks, which can be more easily stowed, readily projected and securely locked in an operative position and easily displaced from an operative position to clear the area adjacent the truck in which it is incorporated.

Another object of the invention is to provide an improved freight handling unit.

A further object of the invention is to provide an arm assembly possessing the advantageous structural features, the inherent meritorious characteristics and the mode of operation herein mentioned.

With the other and above incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a rear elevation view of a truck incorporating lift arm apparatus of the invention in a stowed position;

FIG. 2 is a fragmentary perspective view of the lift apparatus illustrating an arm unit thereof locked in an operating position, projected rearwardly and at right angles to the truck body;

FIG. 3 illustrates the means for releasing the arm unit of FIG. 2 from its operating position;

FIG. 4 is a fragmentary perspective view of the arm of FIG. 2 in a laterally displaced position; and FIG. 5 shows the arm unit of FIG. 2 in condition for selective positioning thereof.

Like parts are indicated by similar characters of reference throughout the several views.

As shown, the arm assembly is embodied in a freight truck. FIG. 1 illustrates the truck body 1 including a rear opening sealed by a pair of doors 2. The doors 2 are respectively hinged to hollow channel members 3 which extend vertically of the truck body and define its lateral extremities.

As may be observed in FIG. 1, the channel members 3 depend below the truck bed 4 and their dependent extremities are transversely connected by a support (not shown) extending parallel to the bed 4. This support pivotally mounts a pair of laterally spaced U-shaped retention brackets B intermediately of the members 3 for purposes to be further described. Elevator housings provided in the members 3 have suitable controls connected for effecting their conjoint vertical movement as required.

The channel members 3 have central openings the length of their opposite adjacent faces exposing the adjacent sides of the elevator housings. Plates 10 respectively fixed to opposite portions of the elevator housings in line with these openings project relative the channel members to mount hinge plates 11 and 12 respectively to their upper and lower extremities. A bar 13 connects the lower extremities of the plates 10 at their edges most adjacent the truck body 1 to form a generally U-shaped frame. By so connecting to the elevator control housings, this frame will naturally move therewith in a vertical plane immediately at the rear of the truck body 1. Hinge plates 11 and 12 are thereby positioned in vertically spaced relation to either side of the truck opening. They include aligned vertically spaced ears 23 projected rearwardly of the truck by means of which an arm assembly 14 is hingedly mounted at either side of the truck opening in a manner and for purposes to be described. Since the arm assemblies 14 are essentially identical in construction, only one need be described.

An assembly 14 includes a vertically oriented relatively shallow plate element 15 which has a laterally projected flange providing a shelf 16 coextensive with its lower extremity and at right angles thereto. The shelf 16 has a pair of longitudinally spaced U-shaped channel members 17 fixed to and opening upwardly of its upper surface. The members 17 are axially aligned. Pivot pins 18, bridging the legs of the members 17 at spaced intervals, respectively mount rollers 19. The rollers 19 are positioned so their uppermost surface portions are generally co-planar and provide a glide surface which is elevated relative the shelf 16. Noting FIG. 2 of the drawings, this glide surface is interrupted by a vertically projected plate 20 formed integral with what may be considered the outer extremity of the shelf 16.

A suspension bar 21 forms the hypotenuse of a right triangle with reference to a base defined by the plate 15. The bar 21 connects to one end at one side of the extremity of plate 15 adjacent the plate 20 and angles upwardly therefrom to have its other end terminate in the plane of the inner extremity of the plate 15. In the example shown the inclination of bar 21 to plate 15 is in the neighborhood of 30 degrees. In addition, a brace bar 22 connects at one end intermediate the extremities of plate 15, and angles upwardly therefrom in co-planar relation to bar 21 to have its other end fixedly connect to the undersurface of bar 21 at its relatively elevated extremity.

The arm assembly 14 so provided, as shown in FIG. 2 of the drawings, includes a hinge portion connected with the joined extremities of the bars 21 and 22 providing vertically spaced ears 24 which accommodate an upper ear 23 on a plate 11 therebetween. A hinge pin 25 extending through the ears 24 and 23 serves to provide a hinged connection of the upper or suspension portion of the arm assembly to the plate 11. Similarly, a hinge unit connected to the inner end of the plate 15 provides a tubular extension 26 aligning with and positioned between vertically spaced ears on the plate 11 and the associated plate 12 therebelow. A hinge pin 27 through the tube 26 and ears 23 provides a second hinge support of the assembly 14 at the plate 15.

Thus, the arm assembly 14 has the configuration of a right triangle, the vertical leg of which forms its inner extremity and is defined by its hinge connection to vertically spaced plates 11 and 12 secured to a plate 10 to one side of the opening to the rear of the truck. The arm assembly is thereby vertically oriented for pivotal or swinging movement to or from the opening to the rear of the truck body 1.

As noted previously, the arm assemblies which are provided to either side of the truck body are similar and similarly hinged. They differ only in respect to the fact that when they are projected from the rear of the truck in generally parallel relation the shelf elements 16 are disposed at their most adjacent sides. Thus, the rollers 19 as arranged on the shelves 16 provide a common glide path and bearings to either side of and in line with the opening to the rear of the truck body 1 at such time.

The bar 13 has a vertically projected portion 28 at its upper edge immediately adjacent each end plate 10. The upper surface of each portion 28 has a central notch 29 and slopes downwardly from the notch at the side adjacent the other portion 28 to provide a cam surface 28'. Each notch 29 axially aligns with the channel members 17 on the adjacent arm assembly when the assembly is projected rearwardly of and perpendicular to the back of the truck. A U-shaped bracket 30 is fixed on the rear extremity of the shelf 16 of each arm assembly to nest and pivotally mount an axial projection on one end of a channel member 31 by means of a pin 32 transversely thereof. Each channel member 31 opens upward and is bridged at spaced intervals by pivot pins 33 rotatably mounting rollers 34 projected vertically and spaced longitudinally thereof. The members 31 are oriented to pivot in a vertical sense on the respective shelves 16 and selectively align in an axial sense with reference to adjacent channel members 17. With the arm assemblies projected in parallel relation, members 31 are adapted to have their ends remote from pivots 32 nest in the respective notches 29 adjacent thereto. The undersurface of the remote ends of the members 31 are suitably formed to facilitate this. In effect members 31 seated in notches 29 form extensions of the arm assemblies and the assemblies are thereby locked against pivoting from the parallel relation established therebetween at this time.

A dependent portion 35 is provided on the underside of each shelf 16. Each portion 35 pivotally mounts one end of a lever 36 to its outer side by means of a pin 37. The levers 36 are arranged to pivot in vertical planes and each provided with an operating lug 38 on its pivoted extremity. Fixed on each portion 35, to the inner end of the assembly 14 to which it mounts and in line with a lever 36, is a tube 39 housing a spring biased plunger 40, the head of which is adjacent the operating lug 38 of the lever and normally biased thereto. Each channel member 31 has a dependent lug 41 on its underside adapted to abut the plunger housed in the adjacent tube 39 when disposed to form an extension of the associated arm assembly. When members 31 are contained in projections 28, as shown in FIG. 2 of the drawings, on depression of the levers 36 their operating lugs 38 are operable to project the adjacent plungers to engage the lugs 41 dependent from the members 31 and thereby pivot the members 31 upwardly from their nested positions in the notches 29. In this manner the arm assemblies are released and thereby enabled to be quickly pivoted outwardly of the truck sides as seen in FIG. 4 of the drawings. Release of levers 36 will permit the members 31 to naturally revert to their positions as extensions of the arm assemblies.

The use of the invention apparatus may be best understood by illustration. Viewing FIG. 1 of the drawings, the arm assemblies 14 are shown in a stowed position folded in to the rear of a truck below the doors 2. In this instance the elevator housings are depressed to a point adjacent the lower end of the channel members 3 sufficient to nest the arm assemblies in the retention brackets B. The brackets B restrain the arm assemblies from inadvertently swinging outwardly of the truck while the truck is in motion. This position of the arm assemblies requires that their extensions 31 be folded back over the shelves 16 to which they mount, as shown in FIG. 5 of the drawings.

When the truck arrives at a destination for loading, it has been found most convenient that material to be transported be introduced to the truck on pallets. In such event fork trucks are employed to move the pallets to the truck. In preparation, the truck doors 2 are swung open, clearing the space between the channel members 3. This enables a vertical elevation of the arm assemblies, by suitable control of the elevator housings, to clear the arm assemblies from brackets B. Then brackets B, due to their pivotal mount, may be pivoted back under the truck bed to clear the channel members. This will enable a maximum range of vertical adjustment of the arm assemblies. The arm assemblies may then be swung out from the back of the truck and oriented in parallel relation. At this point the extensions 31 are pivoted down to nest in the notches 29, as previously described, and the arm assemblies are thereby locked in their projected positions. The arm assemblies are now stably oriented to receive a pallet thereon, the ends of which are caused to rest on the rollers 19. These rollers 19 with the rollers 34 on the extensions 31 offer an easy glide path for movement of the pallet into the truck at any selected level to which the arm assemblies are then raised or lowered.

In the event the circumstances of loading require that the arm assemblies be displaced to enable a proper maneuvering of a fork truck to deliver a pallet, the levers 36 may be depressed to cause the associated plungers to engage the lugs 41 on adjacent members 31 to thereby elevate the members 31 from the notches 29. This permits the arm assemblies to be quickly swung outwardly of the sides of the truck body about their hinge pins. Release of levers 36 permits the extensions 31 to resume their axially projected positions. Then the fork truck may be moved adjacent the truck to properly position the pallet in an elevated position with respect to the arms, whereupon the arm assemblies may be swung back under the pallet, which is then lowered thereon. As the assemblies are swung back, the extensions 31 ride up on the sloping upper surfaces 28 of the projections 28 to automatically fall in the notches 29 as they align therewith. The arms are thereby locked in their projected positions once more for receipt of the pallet on the rollers 19. Suitable vertical adjustment of the arms cause the pallet to be aligned with the proper level so the pallet may be readily slid in to the truck as previously described.

It is believed readily apparent that a similar procedure is employed to discharge a load from a truck. The simplicity of fabrication and use of the support unit of the invention is self evident.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific feature shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A support unit including support means, an elongated support arm pivoted at one end to said support means for a free swinging movement thereon, means defining a glide path over said support arm, means pivoted to the pivot end of said support arm arranged for selective engagement with said support means to fix the position of said arm relative said support means and to providing a surface extending said glide path and means mounted to said arm operatively related to said surface extension means to disengage it from said support means and thereby provide for free pivoting of said arm relative thereto.

2. A support unit including support means, an elongated arm unit one end of which is pivotally connected to said support means, said arm providing a glide surface, means pivoted to said one end of said arm adapted to extend said glide surface and lock said arm in a predetermined position relative said support means, said extension being adapted to be pivoted to release said arm and resume its surface extending position for pivoting movement with said arm relative said support means and means on said support means cooperative with said extension to effect a lock of said arm as the arm is returned to said predetermined position.

3. A material handling unit including an elevatable support bar, a pair of elongated arms pivotally mounted to its respective extremities, said support bar having means defining recesses therein positioned to respectively align with said arms when said arms are substantially perpendicular thereto, means pivotable on said arms from an overlying position to a position providing an extension thereof and in the latter position adapted, when said arms are perpendicular to said support bar, to nest in said recesses and lock said arms in their perpendicular orientation and means on said arms for pivoting said extension means from said recesses to free said arms for free swinging movement on said support bar.

References Cited in the file of this patent

UNITED STATES PATENTS

| 1,556,294 | Meehan | Oct. 6, 1925 |
| 2,521,727 | Kappen | Sept. 12, 1950 |
| 2,605,912 | Small et al. | Aug. 5, 1952 |
| 2,635,771 | Black | Apr. 21, 1953 |
| 2,681,826 | Fraser | June 22, 1954 |
| 2,760,617 | Bowen | Aug. 28, 1956 |
| 3,019,920 | Hillenbrand et al. | Feb. 6, 1962 |